(12) United States Patent
Takimoto et al.

(10) Patent No.: US 11,187,346 B2
(45) Date of Patent: Nov. 30, 2021

(54) VALVE DEVICE, ITS CONTROL DEVICE, CONTROL METHODS USING THE SAME, FLUID CONTROL DEVICE AND SEMICONDUCTOR MANUFACTURING APPARATUS

(71) Applicant: FUJIKIN INCORPORATED, Osaka (JP)

(72) Inventors: Masahiko Takimoto, Osaka (JP); Toshihide Yoshida, Osaka (JP); Kenta Kondo, Osaka (JP); Ryousuke Dohi, Osaka (JP); Kouji Nishino, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 0 days.

(21) Appl. No.: 16/763,731

(22) PCT Filed: Nov. 12, 2018

(86) PCT No.: PCT/JP2018/041776
§ 371 (c)(1),
(2) Date: May 13, 2020

(87) PCT Pub. No.: WO2019/102882
PCT Pub. Date: May 31, 2019

(65) Prior Publication Data
US 2020/0370671 A1 Nov. 26, 2020

(30) Foreign Application Priority Data
Nov. 24, 2017 (JP) .............................. JP2017-225586

(51) Int. Cl.
*F16K 31/02* (2006.01)
*F16K 31/00* (2006.01)
(Continued)

(52) U.S. Cl.
CPC ............ *F16K 31/02* (2013.01); *F16K 31/004* (2013.01); *F16K 1/00* (2013.01); *F16K 27/02* (2013.01); *F16K 31/12* (2013.01)

(58) Field of Classification Search
CPC ........ F16K 31/02; F16K 31/004; F16K 31/12; F16K 1/00; F16K 27/02
(Continued)

(56) References Cited

U.S. PATENT DOCUMENTS 8,141,844 B2 * 3/2012 Crivelli .................... F16K 1/34
251/129.05
10,372,145 B2 * 8/2019 Hirose .............. H01L 21/67069
(Continued)

FOREIGN PATENT DOCUMENTS

| JP | 62-288782 A | 12/1987 |
|---|---|---|
| JP | 2007-64333 A | 3/2007 |
| JP | 2011-154433 A | 8/2011 |

OTHER PUBLICATIONS

International Search Report issued in PCT/JP2018/041776, dated Feb. 5, 2019 and English translation thereof.
Written Opinion issued in PCT/JP2018/041776, dated Feb. 5, 2019.

*Primary Examiner* — Minh Q Le
(74) *Attorney, Agent, or Firm* — Greenblum & Bernstein, P.L.C.

(57) ABSTRACT

A control device for a valve device can detect open/close state of the valve device without using limit switches. The valve device includes a diaphragm for opening and closing a flow path for flowing a fluid, a coil spring for biasing the diaphragm in the closing direction of flow path, a main actuator for driving it against the biasing force of the coil spring, and an adjusting actuator using a piezoelectric element for adjusting the opening degree of the flow path determined by the diaphragm. The controller detects the open/close state of flow path based on the voltage generated
(Continued)

by the piezoelectric element of the adjusting actuator, and controls valve device using the detection signal.

3 Claims, 14 Drawing Sheets

(51) Int. Cl.
*F16K 1/00* (2006.01)
*F16K 27/02* (2006.01)
*F16K 31/12* (2006.01)

(58) Field of Classification Search
USPC .................. 251/129.02; 137/487.5, 624.27; 156/345.15, 345.24; 118/715

See application file for complete search history.

(56) References Cited

U.S. PATENT DOCUMENTS

| | | | |
|---|---|---|---|
| 2001/0038083 A1* | 11/2001 | Sakurai | F16K 31/007 251/129.06 |
| 2009/0179088 A1* | 7/2009 | Mochizuki | F02D 41/2096 239/584 |
| 2010/0127196 A1* | 5/2010 | Sawada | F16K 31/007 251/129.06 |
| 2010/0294964 A1* | 11/2010 | Matsumoto | F16K 7/14 251/129.01 |
| 2013/0216928 A1* | 8/2013 | Nakajima | H01M 16/00 429/447 |
| 2014/0109995 A1* | 4/2014 | Moler | G05D 7/0635 137/487.5 |
| 2017/0037987 A1* | 2/2017 | Dohi | G01F 15/005 |
| 2018/0003312 A1* | 1/2018 | Schupp | F16K 31/007 |
| 2020/0132216 A1* | 4/2020 | Funakoshi | F16K 37/00 |
| 2020/0224776 A1* | 7/2020 | Yoshida | H01L 21/205 |
| 2020/0278234 A1* | 9/2020 | Kondo | G01F 15/066 |

* cited by examiner

[fig.1]
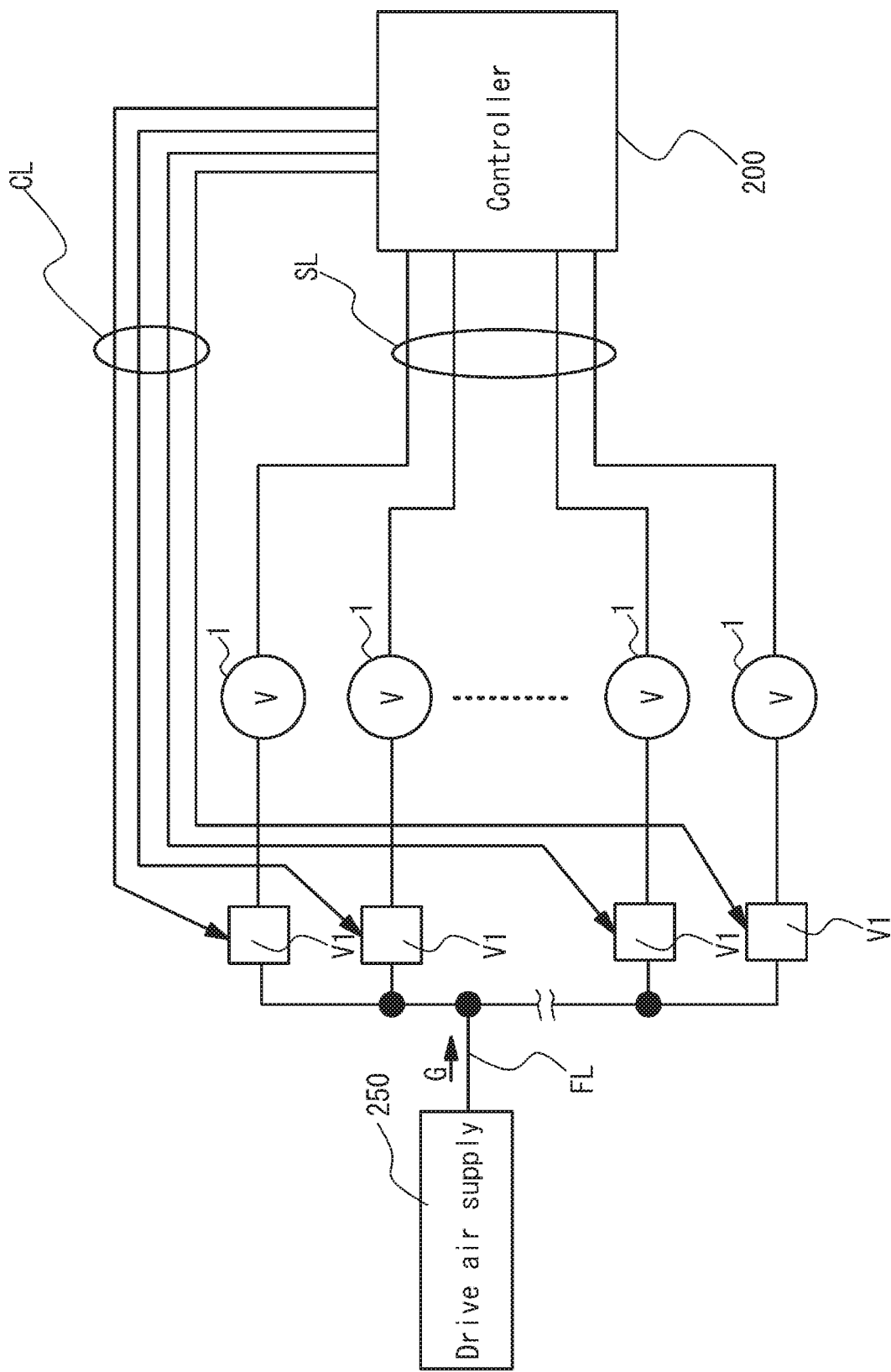

[fig.2]
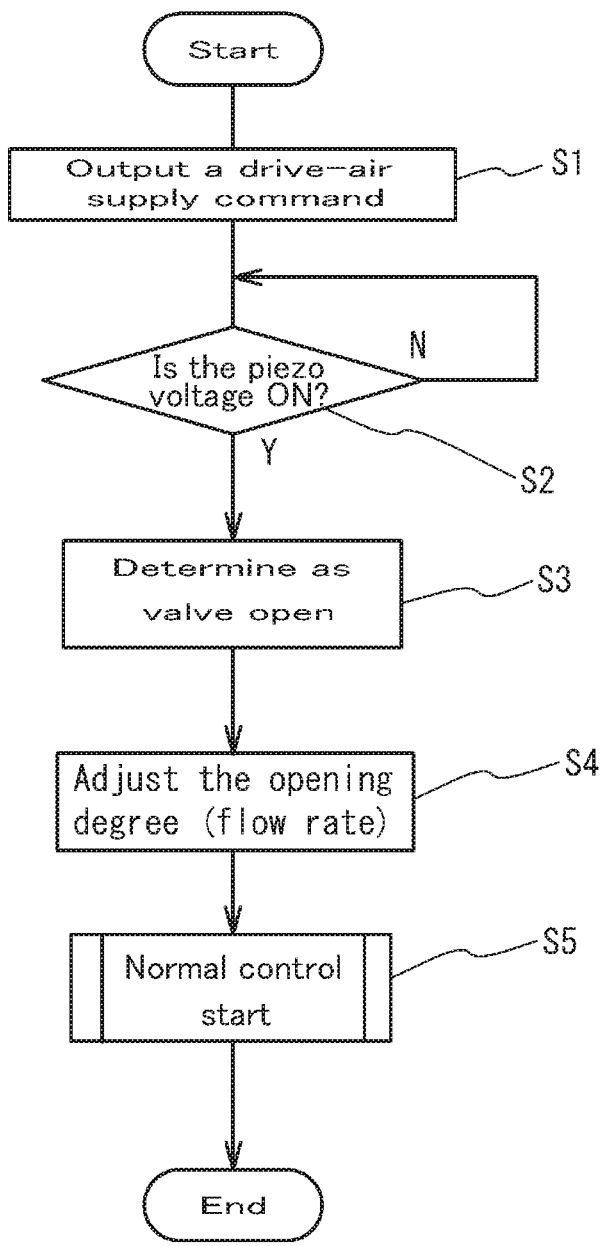

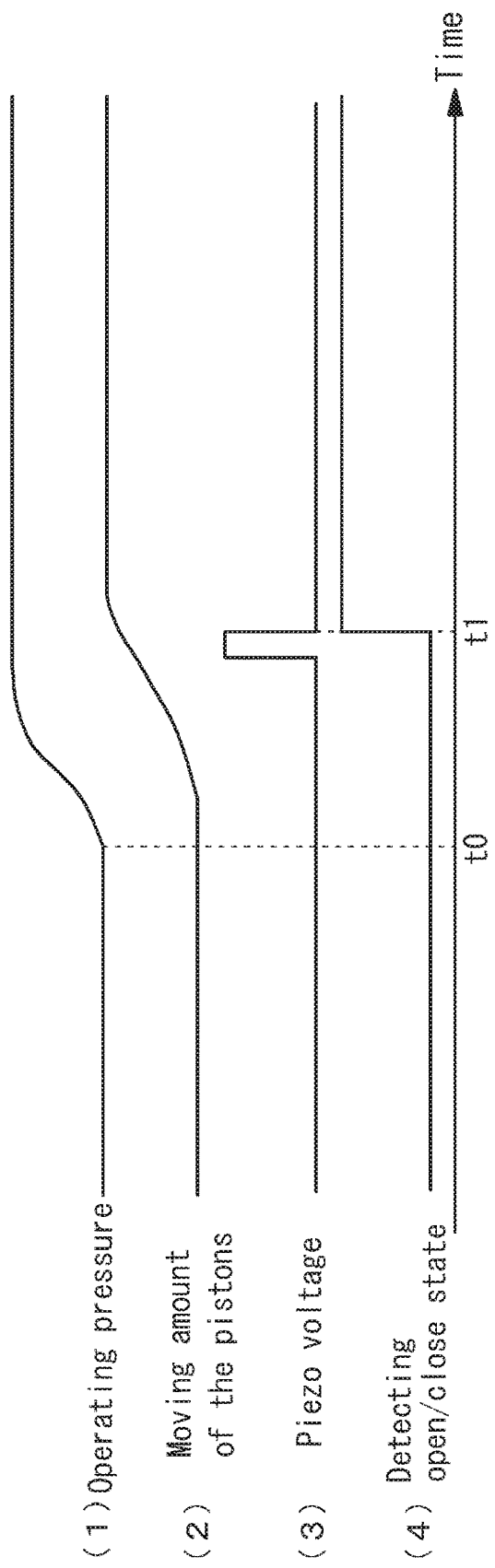

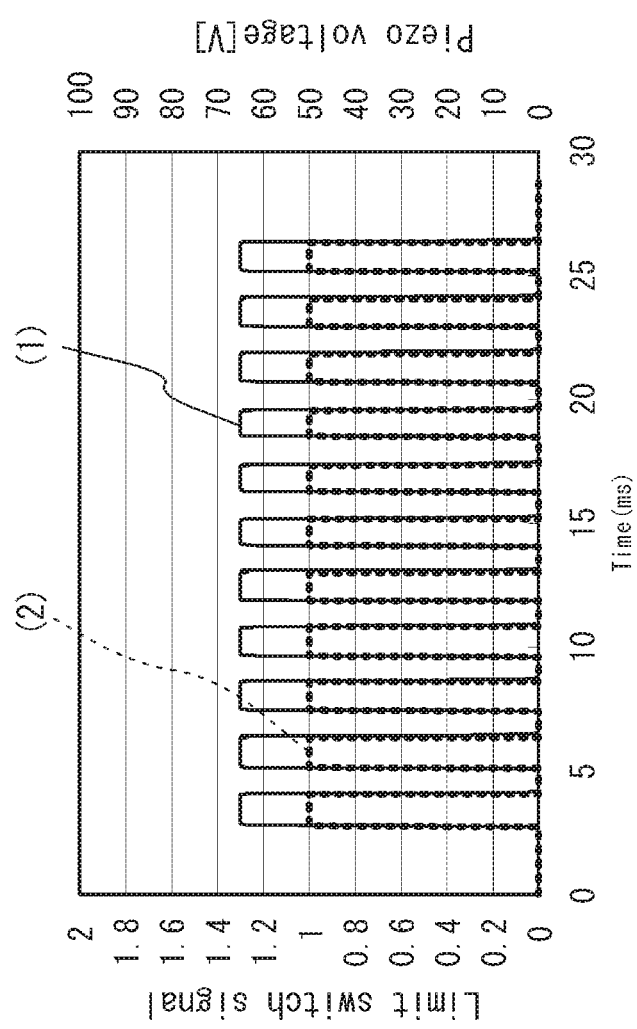
[fig.4A]

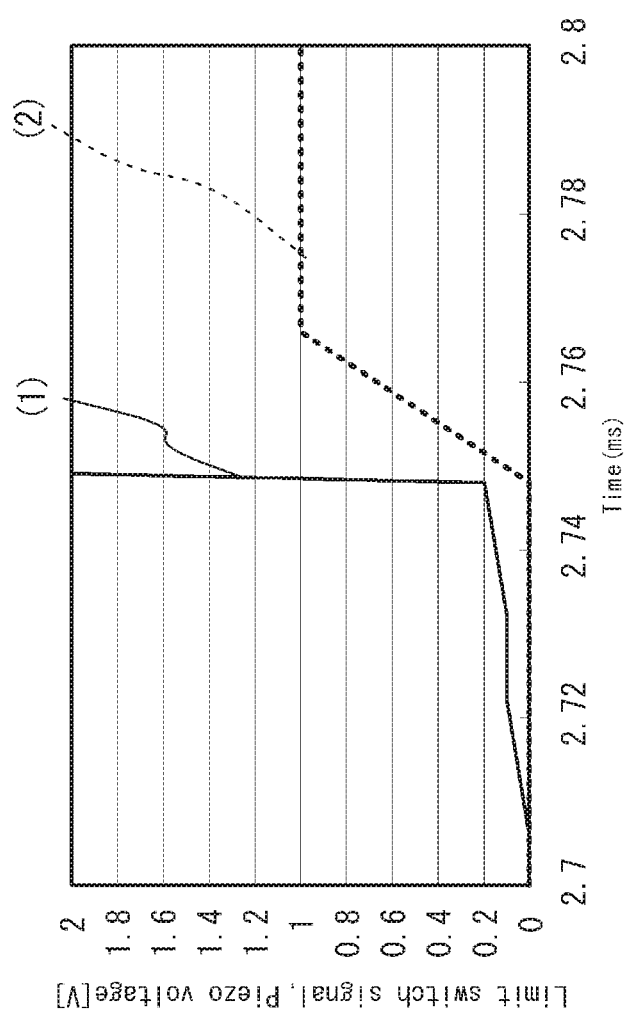
[fig.4B]

[fig.5]
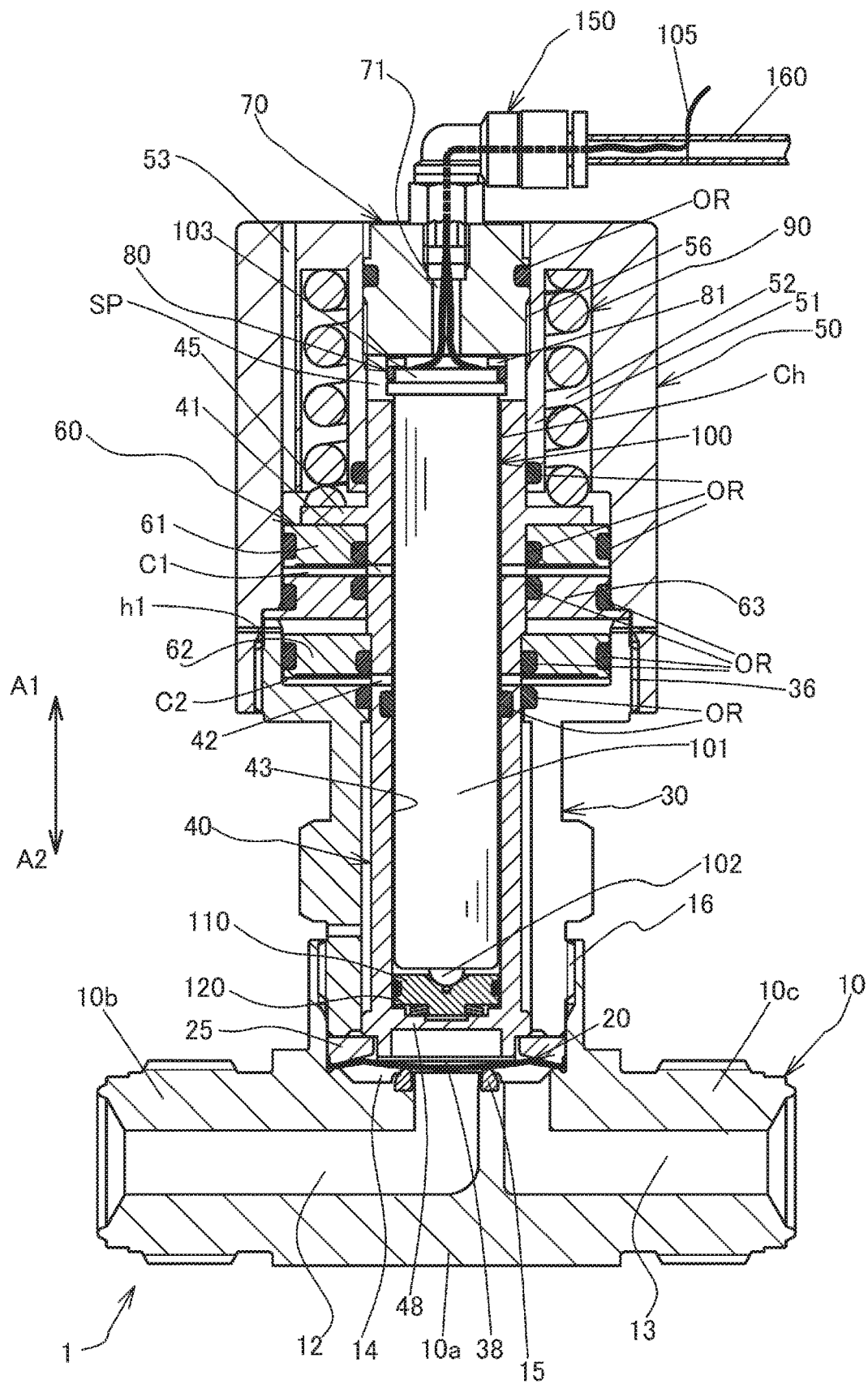

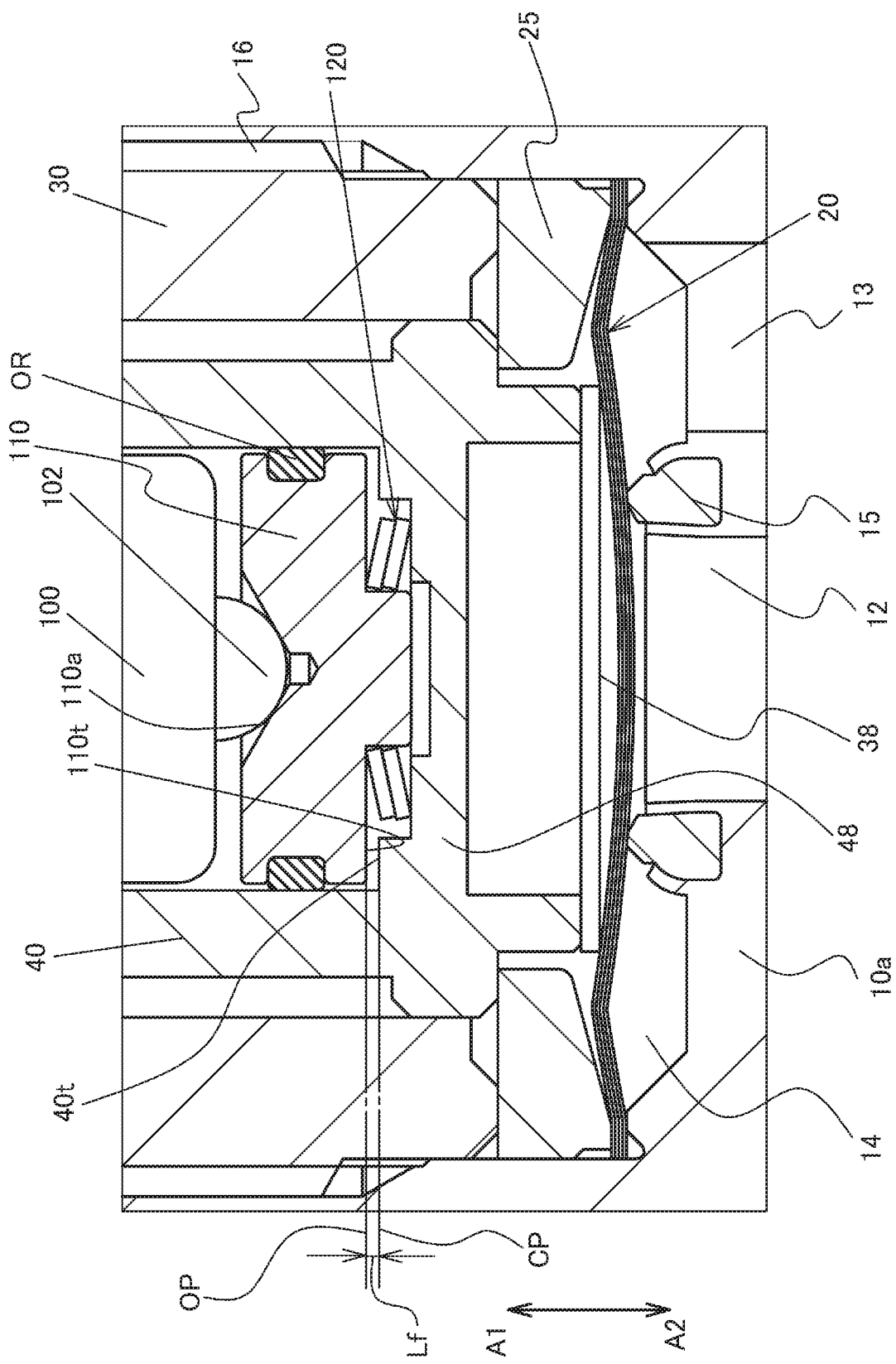
[fig.6]

[fig.7]
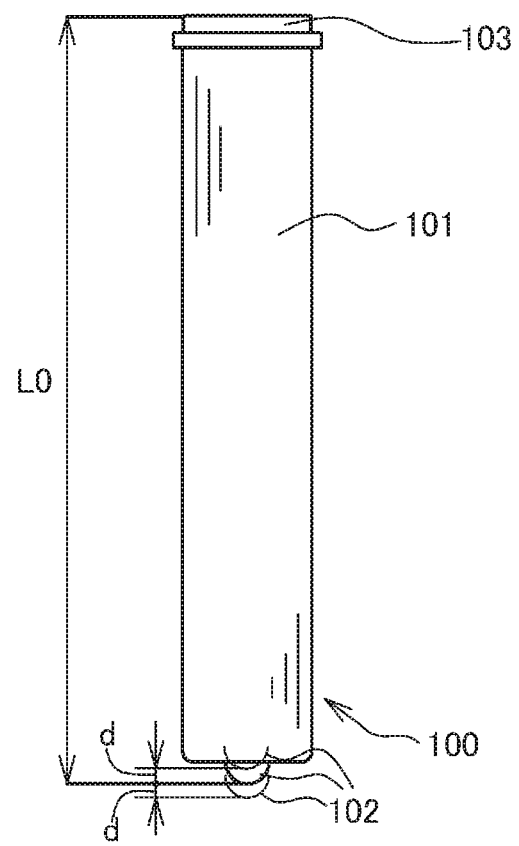

[fig.8]
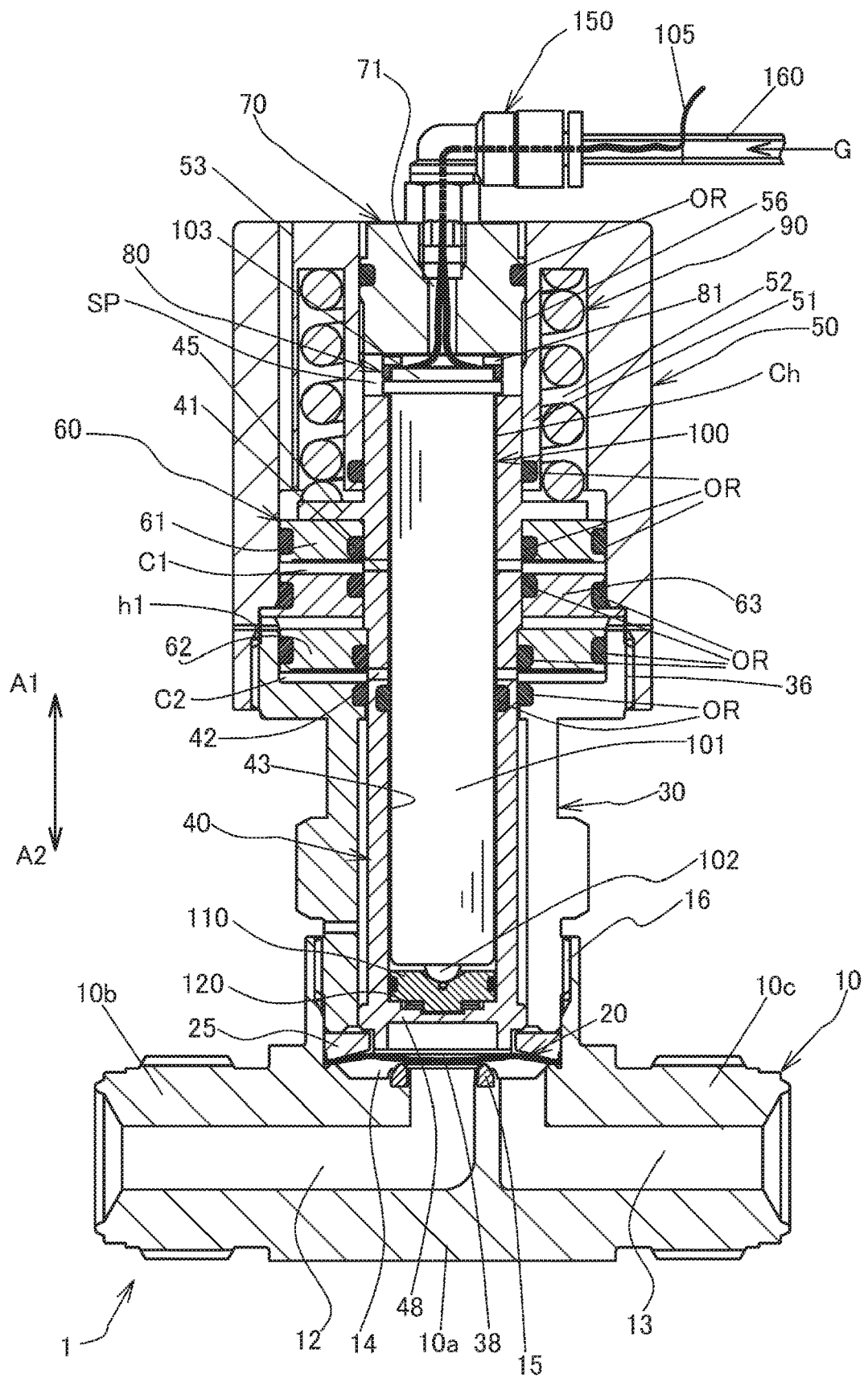

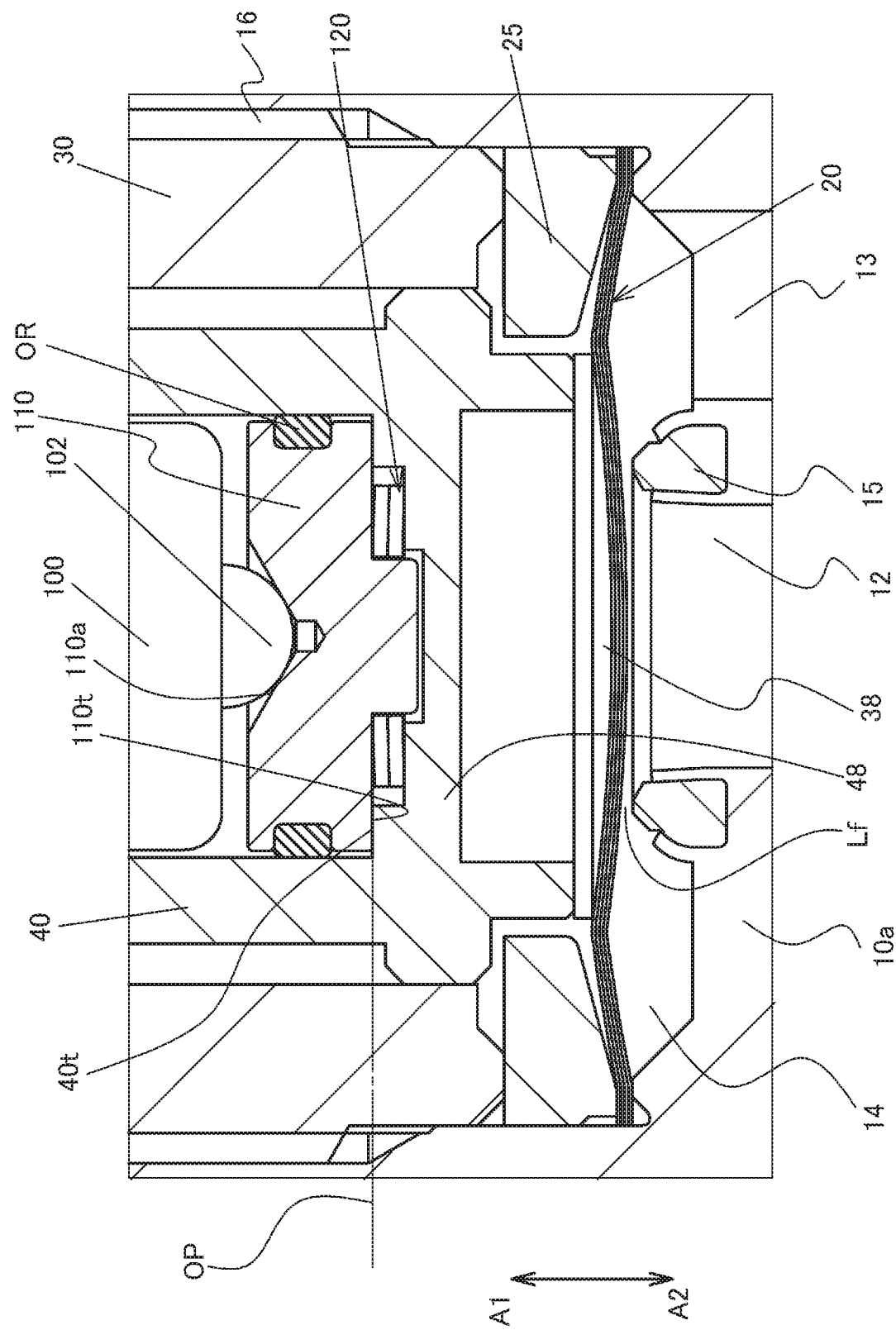

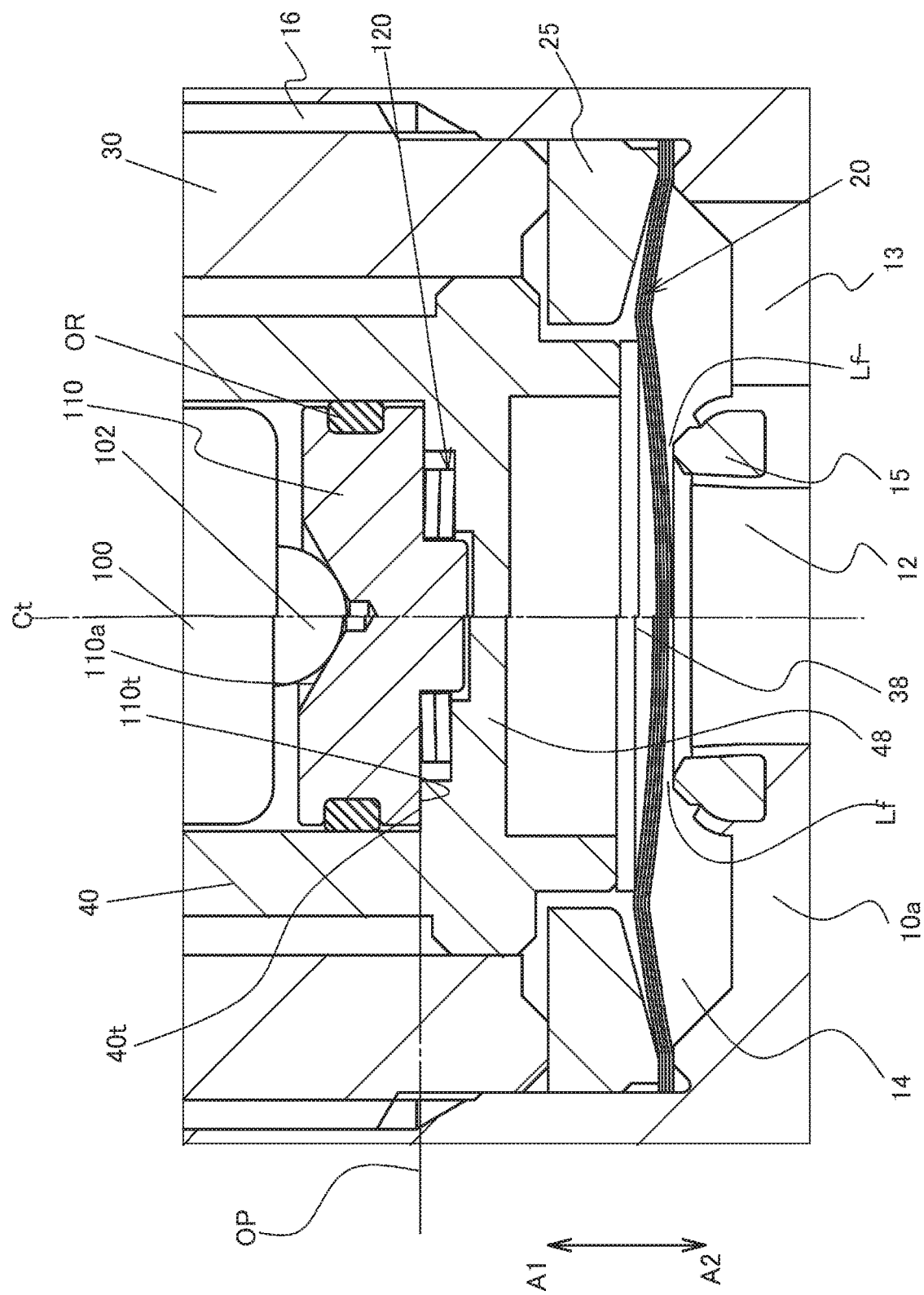
[fig. 10A]

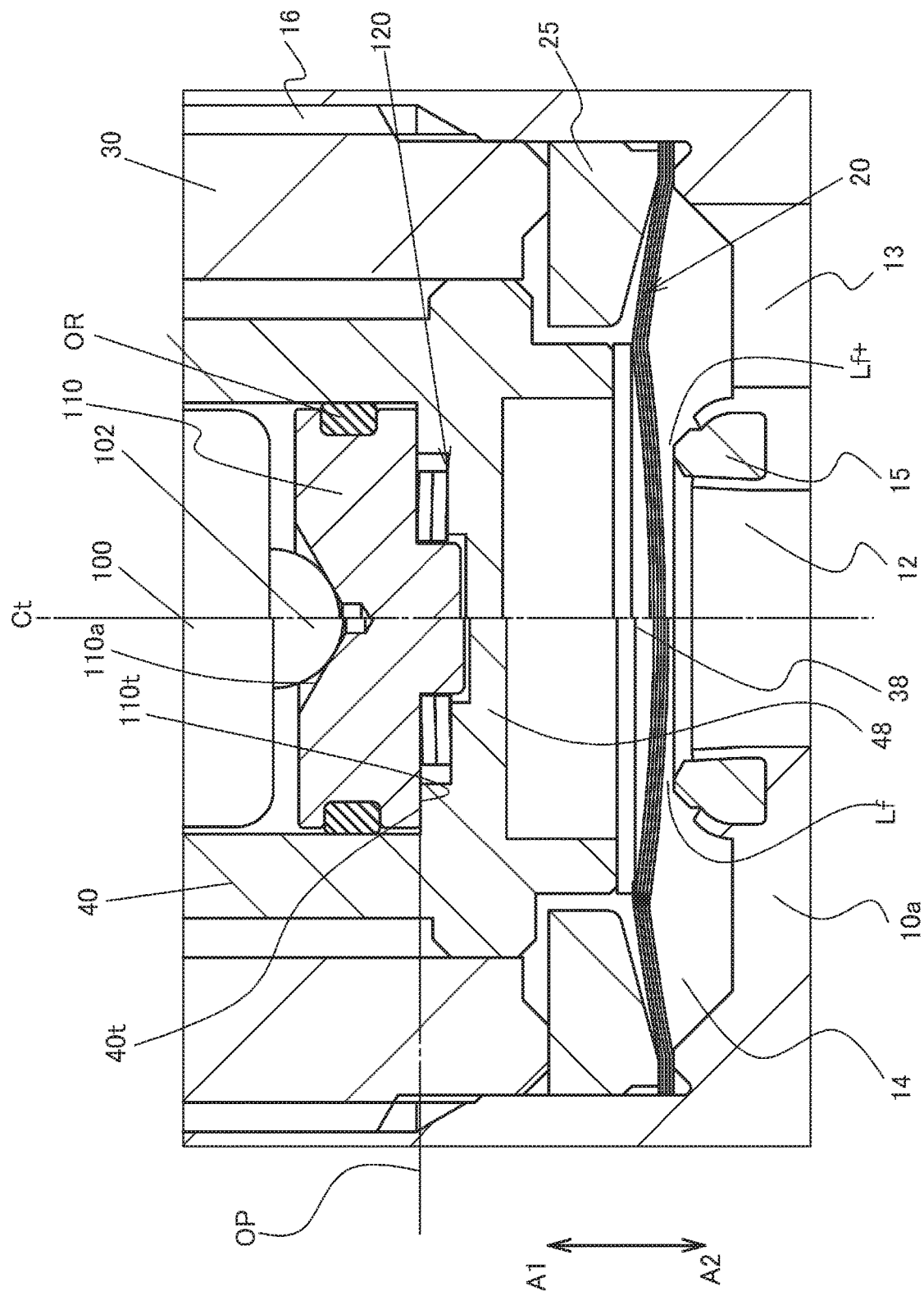
[Fig. 10B]

[fig.11]
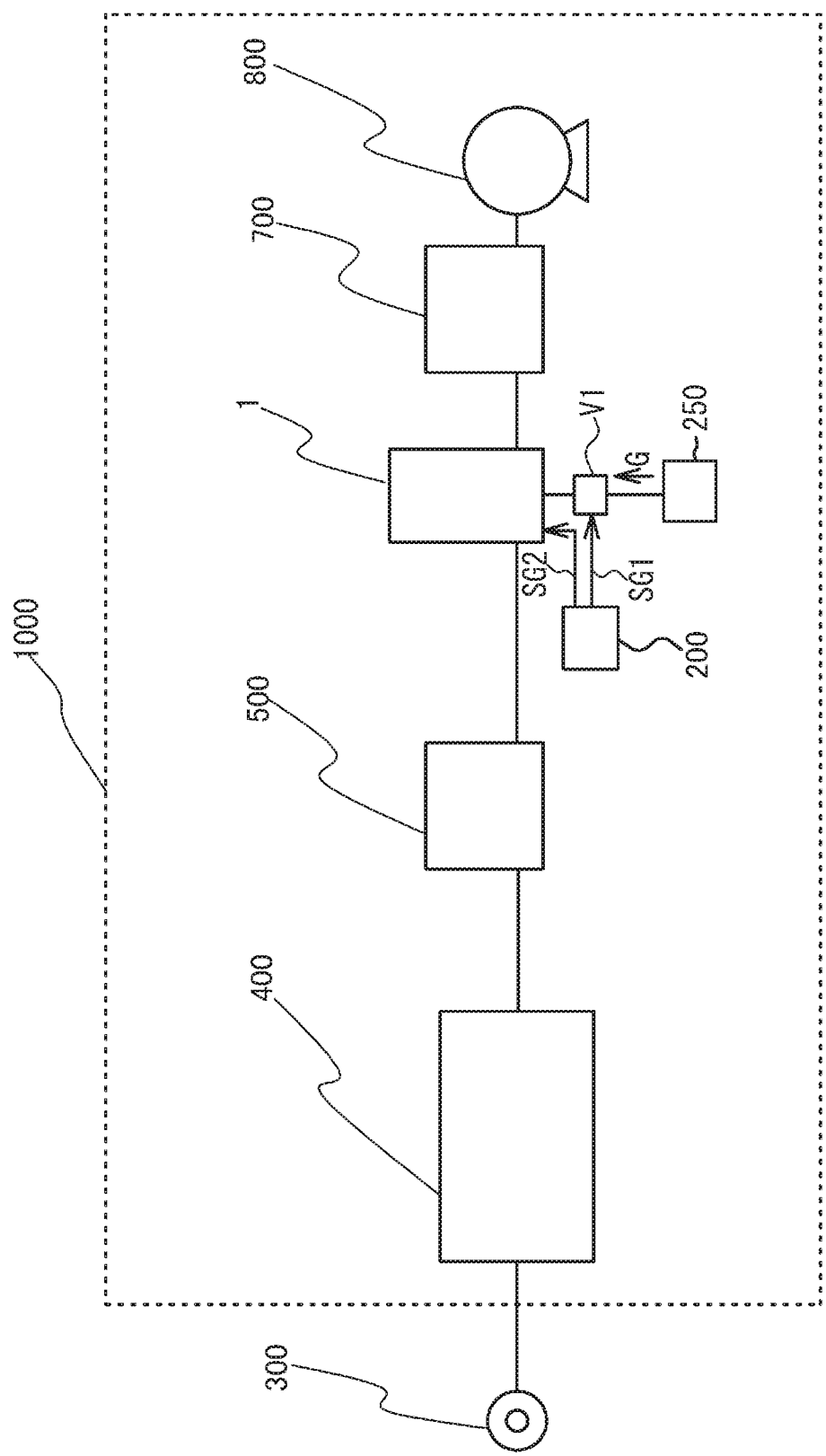

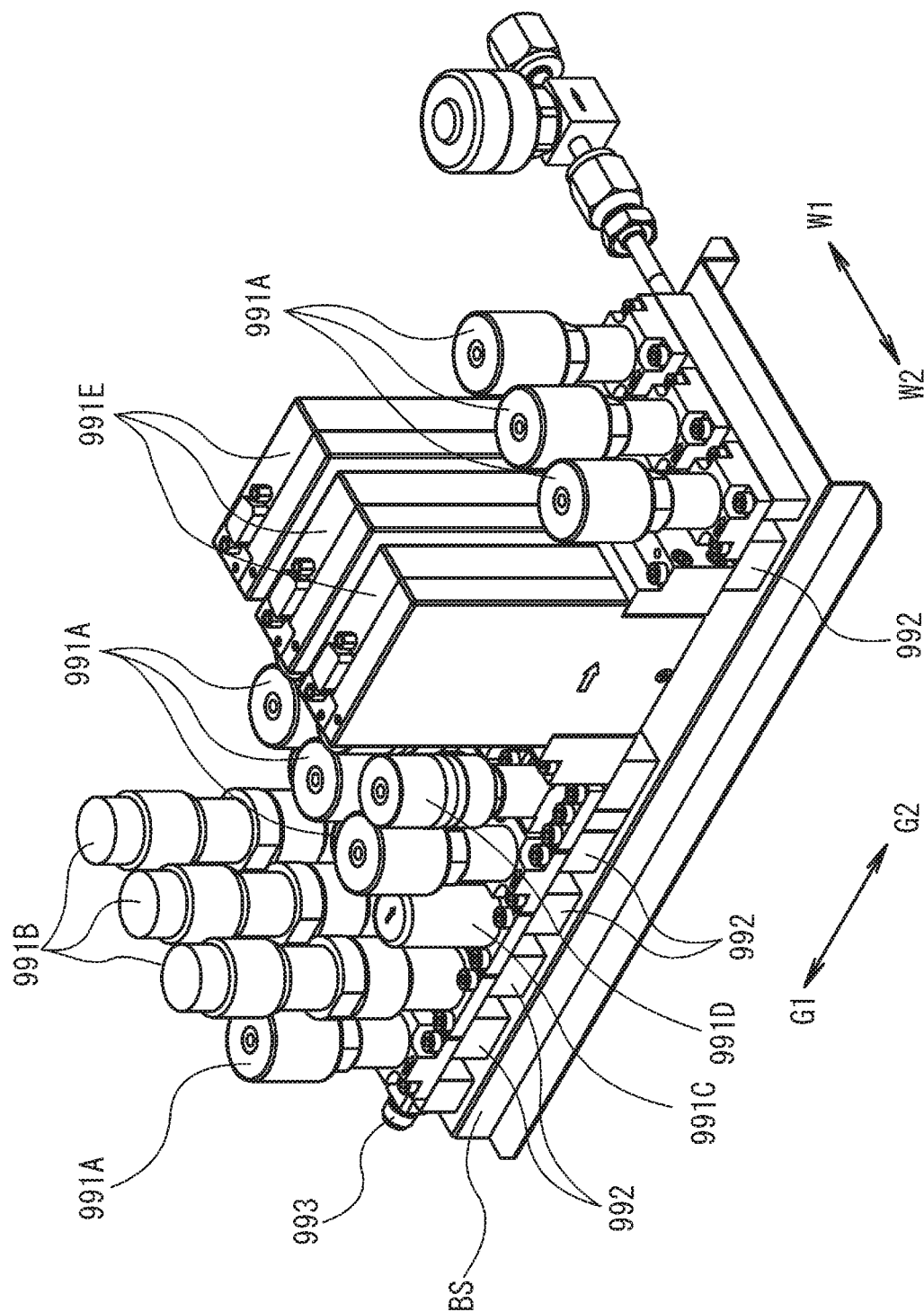
[fig. 12]

VALVE DEVICE, ITS CONTROL DEVICE, CONTROL METHODS USING THE SAME, FLUID CONTROL DEVICE AND SEMICONDUCTOR MANUFACTURING APPARATUS

TECHNICAL FIELD

The present disclosure relates to a valve device and its control device.

BACKGROUND ART

In the semiconductor manufacturing process, a fluid control device, called an integrated gas system, which integrates a variety of fluid devices, such as open-close valves, regulators, and mass flow controllers, is used to supply accurately measured process gases to the processing chamber (see, for example, Patent Literature 1).

PATENT LITERATURE

PTL 1: Japanese Laid-Open Patent Application No. 2007-64333

PTL 2: Japanese Laid-Open Patent Application No. 2011-154433

SUMMARY OF INVENTION

Technical Problem

To control the supply of process gases in various manufacturing processes, higher responsiveness is required, and to this end, the fluid control device should be as compact and integrated as possible and installed closer to the processing chamber where the fluid is supplied.

In valve devices used in fluid control devices disclosed in Patent Literature 2 and others, the open/close status of the valves are detected by using limit switches.

When a valve device having a limit switch to detect the open/close status is used for a semiconductor manufacturing apparatus, miniaturization of the semiconductor manufacturing apparatus is prevented.

It is an object of the present invention to provide a valve device and its control device which can detect the open/close state of valves without using limit switches.

Solution to Problem

A valve device according to the present invention comprises a valve element for opening and closing a flow path for flowing a fluid, a biasing unit that biases the valve element toward the closing direction of the flow path, a main actuator for moving the valve element against the biasing force of the biasing means, and an adjusting mechanism utilizing a piezoelectric element for adjusting the opening degree of the flow path determined by the valve element, wherein the piezoelectric element is configured to output a voltage generated by the piezoelectric element or a signal based on the voltage.

The control device of the present invention is a control device for a valve device, wherein valve device comprises:

a valve element that opens and closes the flow path for flowing a fluid, a biasing unit that biases the valve element toward the closing direction of the flow path, an actuator for moving the valve element against the biasing force of the biasing unit, and an adjusting mechanism utilizing a piezoelectric element for adjusting the opening degree of the flow path determined by the valve body, the control device comprising:

a detecting unit for detecting open/close state of the flow path based on the voltage generated by the piezoelectric element, and a control unit that controls the valve device by utilizing the detection signals of the detection unit.

The control method of the present invention is a control method for a valve device, wherein valve device comprises:

a valve element that opens and closes a flow path for flowing a fluid, a biasing unit that biases the valve element toward the closing direction of the flow path, an actuator for driving the valve element against the biasing force, and an adjusting mechanism utilizing a piezoelectric element for adjusting the opening degree of the flow path determined by the valve body, the control method comprising:

detecting open/close state of the flow path based on the voltage generated by the piezoelectric element, and controlling the valve device by using the detected signal.

The flow rate control method of the present invention comprises controlling the flow rate of the fluid by using the control device having the above-described configuration.

The fluid control device of the present invention is a fluid control device comprising a plurality of fluid devices that are arranged, the plurality of fluid devices including the valve device having the above-described configuration.

The semiconductor manufacturing method of the present invention comprises using a control device having the above configuration to flow rate control of a process gas in a manufacturing process of a semiconductor device requiring a processing step by the process gas in a sealed chamber.

The semiconductor manufacturing apparatus of the present invention comprises a control device having the above configuration to control a process gas in a semiconductor manufacturing process that requires a processing step by the process gas in a sealed chamber.

Advantageous Effects of Invention

According to the present invention, the piezoelectric element of the adjusting actuator generates a voltage when receiving a driving force of the main actuator, and by detecting this voltage, it is possible to determine the open/close state of flow path and to control the valve device. In other words, the adjusting actuator can also be used as a highly responsive detector for detecting the open/close state of the flow path, resulting in elimination of the need for a limit switch.

BRIEF DESCRIPTION OF DRAWINGS

FIG. 1 is a schematic configuration diagram of a valve system according to an embodiment of the present invention.

FIG. 2 is a flowchart showing an example of the processing of the controller.

FIG. 3 is a timing chart for explaining the detection timing of valve open/close state by the controller.

FIG. 4A is a graph showing a generated voltage of the piezoelectric device and a limit switch signal as a comparative example when opening and closing valve device 1 at a constant frequency.

FIG. 4B is a graph showing an enlarged view of rise of the generated voltage of the piezoelectric device and the limit switch signal in the graph of FIG. 4A.

FIG. 5 is a longitudinal cross-sectional view of an exemplary valve device to which the present invention is applied.

FIG. 6 is an enlarged cross-sectional view of a main part of the valve device of FIG. 5 in a closed state.

FIG. 7 is an explanatory drawing showing the operation of the piezoelectric actuator.

FIG. 8 is a longitudinal cross-sectional view of the valve device of FIG. 1 in an open state.

FIG. 9 is an enlarged cross-sectional view of a main part of the valve device of FIG. 8.

FIG. 10A is an enlarged cross-sectional view of a main part for explaining a state during flow rate adjustment (during flow rate decrease) of the valve device in FIG. 8.

FIG. 10B is an enlarged cross-sectional view of a main part for explaining a state during flow rate adjustment (during flow rate increase) of the valve device in FIG. 8.

FIG. 11 is a schematic diagram showing an application example of the valve device according to an embodiment of the present invention to a semiconductor manufacturing process.

FIG. 12 is a perspective view showing an example of a fluid control device using valve device of the present embodiment.

DESCRIPTION OF EMBODIMENTS

Embodiments of the present invention will be described below with reference to the drawings. Now that, in the present specification and the drawings, components having substantially the same function are denoted using the same reference numerals, and duplicate descriptions thereof is omitted.

FIG. 1 is a schematic configuration diagram of a valve system to which a controller 200 as a control device according to an embodiment of the present invention is applied.

First, prior to describing this valve system, an example of valve device 1 used in the valve system will be described with reference to FIG. 5 to FIG. 10B.

FIG. 5 is a diagram illustrating a configuration of a valve device to which the present invention is applied, and shows a state in which the valve is fully closed, FIG. 6 is an enlarged cross-sectional view of a main part of FIG. 5, and FIG. 7 is a diagram for explaining an operation of a piezoelectric actuator as an adjusting actuator. In the following descriptions, it is assumed that an upward direction is an opening direction A1 and a downward direction is a closing direction A2.

In FIG. 5, 10 denotes a valve body, 20 denotes a diaphragm as a valve element, 38 denotes a diaphragm presser, 30 denotes a bonnet, 40 denotes an operating member, 50 denotes a casing, 60 denotes a main actuator, 70 denotes an adjustment body, 80 denotes an actuator presser, 90 denotes a coil spring, 100 denotes a piezoelectric actuator as an adjusting actuator, 110 denotes an actuator receiver, 120 denotes a disk spring as an elastic member, and OR denotes an O-ring as a sealing member.

The valve body 10 is made of stainless steel and has a block-shaped valve body main unit 10a and connecting portions 10b and 10c protruding from the respective sides of valve body main unit 10a, and defines flow paths 12 and 13. One end of each of the flow paths 12 and 13 opens at an end surface of the connecting portions 10b and 10c, respectively, and the other end communicates with a valve chamber 14 having a recessed shape opened upward. On the bottom surface of the valve chamber 14, a valve seat 15 made of a synthetic resin (PFA, PA, PI, PCTFE, etc.) is fitted and fixed to the mounting groove provided in the peripheral edge of an opening on the other end side of flow path 12. In the present embodiment, as is clear from FIG. 6, the valve seat 15 is fixed in the mounting groove by crimping.

The diaphragm 20 is a valve element provided so as to be able to open and close the flow paths 12 and 13 of the valve body 10, is disposed above the valve seat 15, maintains the airtightness of the valve chamber 14, and opens and closes the flow paths 12 and 13 when the central portion thereof moves up and down to be seated on and off the valve seat 15. In the present embodiment, the diaphragm 20 has a spherical shell shape in which an upward convex arc shape in natural state formed by swelling upward a central portion of a metal thin plate of special stainless steel or the like and a nickel-cobalt alloy thin plate. Three such special stainless-steel sheets and one nickel-cobalt alloy sheet are laminated to form a diaphragm 20.

The diaphragm 20 is mounted on a protruding portion of the inner peripheral surface of the valve chamber 14 at its peripheral edge portion, and is pressed toward the protruding portion side of the valve body 10 via a pressing adapter 25 made of stainless alloy by inserting the lower end portion of the bonnet 30 into the valve chamber 14 and screwing the lower end portion with the screw portion 16 of the valve body 10, and is clamped and fixed in an airtight state. The nickel-cobalt alloy thin film is disposed on the gas contact side.

It should be noted that diaphragms having other configurations can also be used.

The operating member 40 is a member for operating the diaphragm 20 so as to make the diaphragm 20 open and close the flow paths 12 and 13, and is formed in a substantially cylindrical shape, closed at its lower end by the closing part 48, opened at its upper end, fitted to the inner peripheral surface of the bonnet 30 and the inner peripheral surface of the cylindrical portion 51 formed in the casing 50, and supported movably in the vertical direction. Note that A1 and A2 shown in FIGS. 5 and 6 indicate the opening and closing directions of the operating member 40. A1 indicates the opening direction, and A2 indicates the closing direction. In the present embodiment, the upward direction is the opening direction A1 and the downward direction is the closing direction A2 with respect to the valve body 10, but the present invention is not limited thereto.

A diaphragm presser 38 made of a synthetic resin such as polyimide and abutting on the upper surface of the central portion of the diaphragm 20 is attached to the lower end surface of the operating member 40.

A coil spring 90 is provided between the upper surface of the flange portion 45 formed on the outer peripheral surface of the operating member 40 and the ceiling surface of the casing, and the operating member 40 is constantly biased in the closing direction A2 by the coil spring 90. Therefore, as shown in FIG. 6, in a state in which the main actuator 60 is not operated, the diaphragm 20 is pressed against the valve seat 15, and the gateway between the flow paths 12 and 13 is closed.

The flange portion 45 may be integral with or separate from the operating member 40.

The coil spring 90 is accommodated in a holding part 52 formed between the inner peripheral surface of the casing 50 and the cylindrical portion 51. In the present embodiment, the coil spring 90 is used, but the present invention is not limited thereto, and other types of springs such as a disk spring and a leaf spring can be used.

The casing 50 is fixed to the bonnet 30 by screwing the inner periphery of the lower end portion thereof into a screw portion 36 formed on the outer periphery of the upper end portion of the bonnet 30. An annular bulkhead 63 is fixed between the upper end surface of the bonnet 30 and the casing 50.

Cylinder chambers C1 and C2 vertically partitioned by a bulkhead 63 are formed between the outer peripheral surface of the operating member 40 and the casing 50 and the bonnet 30.

A piston 61 formed in an annular shape is fitted and inserted into the upper cylinder chamber C1, and a piston 62 formed in an annular shape is fitted and inserted into the lower cylinder chamber C2. The cylinder chambers C1 and C2 and the pistons 61 and 62 constitute a main actuator 60 for moving the operating member 40 in the opening direction A1. The main actuator 60 is configured so that the force by the operating gas can be increased by increasing the working area of the pressure using the two pistons 61 and 62.

The space above the piston 61 of the cylinder chamber C1 is connected to the atmosphere by the air passage 53. The space above the piston 62 of the cylinder chamber C2 is connected to the atmosphere by the air passage h1.

Since high-pressure operating gas is supplied to the space below the pistons 61 and 62 of the cylinder chambers C1 and C2, the O-ring OR maintains airtightness. These spaces communicate with the flow passages 41 and 42 formed in the operating member 40, respectively. The flow passages 41 and 42 communicate with a flow passage Ch formed between the inner peripheral surface of the operating member 40 and the outer peripheral surface of the case body 101 of the piezoelectric actuator 100, and the flow passage Ch communicates with a space SP formed by the upper end surface of the operating member 40, the cylindrical portion 51 of the casing 50, and the lower end surface of the adjustment body 70. The flow passage 81 formed in the annular actuator presser 80 connects the space SP and the flow passage 71 passing through the center of the adjustment body 70. The flow passage 71 of the adjustment body 70 communicates with the pipe 160 via the pipe fitting 150.

The piezoelectric actuator 100 incorporates a laminated piezoelectric element (not shown) in a cylindrical case body 101 shown in FIG. 7. The case body 101 is made of a metal such as a stainless-steel alloy, and the end surface on the side of the hemispherical fore-end portion 102 and the end surface on the side of the base end portion 103 are closed. By applying a voltage to the laminated piezoelectric element and extending it, the end surface of the case body 101 on the side of the fore-end portion 102 is elastically deformed, and the hemispherical fore-end portion 102 is displaced in the longitudinal direction. Assuming that the largest stroke of the stacked piezoelectric elements is 2d, the total length of the piezoelectric actuator 100 becomes L0 by previously applying a predetermined voltage V0 at which the elongation of the piezoelectric actuator 100 becomes d. When a voltage higher than the predetermined voltage V0 is applied, the total length of the piezoelectric actuator 100 becomes L0+d at the maximum, and when a voltage (including no voltage) lower than the predetermined voltage V0 is applied, the total length of the piezoelectric actuator 100 becomes L0−d at the minimum. Therefore, it is possible to expand and contract the entire length from the fore-end portion 102 to the base end portion 103 in the opening and closing directions A1 and A2. In the present embodiment, the fore-end portion 102 of the piezoelectric actuator 100 is hemispherical, but the present invention is not limited thereto, and the fore-end portion may be a flat surface.

As shown in FIG. 5, power is supplied to the piezoelectric actuator 100 by a wiring 105. The wiring 105 is led through the flow passage 71 of the adjustment body 70 and the pipe fitting 150 to the pipe 160, and is led out to the outside from the middle of the pipe 160.

The position of the base end portion 103 of the piezoelectric actuator 100 in the opening/closing direction is defined by the lower end surface of the adjustment body 70 via the actuator presser 80. In the adjustment body 70, a screw portion provided on the outer peripheral surface of the adjustment body 70 is screwed into the screw hole 56 formed in the upper portion of the casing 50, and the position of the piezoelectric actuator 100 in the opening and closing directions A1 and A2 can be adjusted by adjusting the position of the adjustment body 70 in the opening and closing directions A1 and A2.

As shown in FIG. 6, the fore-end portion 102 of the piezoelectric actuator 100 abuts against a conical receiving surface 110a formed on the upper surface of the disk-shaped actuator receiver 110. The actuator receiver 110 is movable in the opening and closing directions A1 and A2.

Between the lower surface of the actuator receiver 110 and the upper surface of the closing part 48 of the operating member 40, a disk spring 120 as an elastic member is provided. In the state shown in FIG. 6, the disk spring 120 is already compressed to some extent and elastically deformed, and the actuator receiver 110 is constantly biased in the opening direction A1 by the restoring force of the disk spring 120. As a result, the piezoelectric actuator 100 is also constantly biased in the opening direction A1, and the upper surface of the base end portion 103 is pressed against the actuator presser 80. Thus, the piezoelectric actuator 100 is disposed at a predetermined position with respect to the valve body 10. Since the piezoelectric actuator 100 is not connected to any member, it is relatively movable in the opening and closing directions A1, A2 with respect to the operating member 40.

The number and orientation of the disk springs 120 can be appropriately changed according to conditions. In addition, other elastic members such as a coil spring and a leaf spring can be used in addition to the disk spring 120, but the use of the disk spring has an advantage that the spring rigidity, the stroke, and the like can be easily adjusted.

As shown in FIG. 6, in a state in which the diaphragm 20 abuts against the valve seat 15 and the valve is closed, a gap is formed between the regulating surface 110t on the lower surface side of the actuator receiver 110 and the abutting surface 40t on the upper surface side of the closing part 48 of the operating member 40. The distance of this gap corresponds to the lift amount Lf of the diaphragm 20. The lift amount Lf defines the opening degree of the valve, that is, the flow rate. The lift amount Lf can be changed by adjusting the position of the adjustment body 70 in the opening and closing directions A1 and A2. The operating member 40 in the state shown in FIG. 6 is positioned at the closed position CP with reference to the abutting surface 40t. When the abutting surface 40t moves to a position where it abuts the regulating surface 110t of the actuator receiver 110, that is, to the open position OP, the diaphragm 20 is separated from the valve seat 15 by the lift amount Lf.

Next, the operation of the valve device 1 having the above-described configuration will be described by referring to FIGS. 8 to 10B.

As shown in FIG. 8, when the operation gas G having a predetermined pressure is supplied into the valve device 1 through the pipe 160, the operation gas G is supplied through a passage 71, through a passage Ch formed between the inner surface 43 of the operating member 40 and the outer peripheral surface of the case body 101, and through the passages 41, 42 to a space under the pistons 61, 62 of the cylinder chambers C1, C2. Thus, a thrust force for pushing the pistons 61, 62 upward in the opening direction A1 acts on the operating member 40. The pressure of the operating gas G is set to a value sufficient to move the operating member 40 in the opening direction A1 against the biasing force in the closing direction A2 acting on the operating member 40 from the coil spring 90 and the disk spring 120. When such an operation gas G is supplied, as shown in FIG. 9, the operating member 40 moves in the opening direction A1 while further compressing the disk spring 120, the abutting surface 40t of the operating member 40 abuts on the regulating surface 110t of the actuator receiver 110, and the actuator receiver 110 receives a force from the operating member 40 toward the opening direction A1. This force toward the opening direction acts as a force that compresses the piezoelectric actuator 100 in the opening direction A1 through the fore-end portion 102 of the piezoelectric actuator 100, but the piezoelectric actuator 100 has sufficient rigidity to resist this force. Therefore, the force in the opening direction A1 acting on the operating member 40 is received by the fore-end portion 102 of the piezoelectric actuator 100, and the movement of the operating member 40 in the A1 direction is restricted in the open position OP. In this state, the diaphragm 20 is separated from the valve seat 15 by the lift amount Lf described above.

When it is desired to adjust the flow rate of the fluid output and supplied through the flow path 13 of the valve device 1 in the state shown in FIG. 9, the piezoelectric actuator 100 is operated.

The left side of the center line Ct in FIGS. 10A and 10B shows a state shown in FIG. 9, and the right side of the center line Ct shows a state after the positions of the opening and closing directions A1 and A2 of the operating member 40 are adjusted.

When the flow rate of the fluid is adjusted in the decreasing direction, as shown in FIG. 10A, the piezoelectric actuator 100 is extended to move the operating member 40 in the closing direction A2. As a result, the lift amount Lf− after adjustment, which is the distance between the diaphragm 20 and the valve seat 15, becomes smaller than the lift amount Lf before adjustment.

When the flow rate of the fluid is adjusted in the increasing direction, the piezoelectric actuator 100 is shortened to move the operating member 40 in the opening direction A1 as shown in FIG. 10B. As a result, the lift amount Lf+ after adjustment, which is the distance between the diaphragm 20 and the valve seat 15, becomes larger than the lift amount Lf before adjustment.

The maximum value of the lift amount of the diaphragm 20 is about 100 to 200 μm, and the adjustment amount by the piezoelectric actuator 100 is about ±20 μm.

That is, the stroke of the piezoelectric actuator 100 cannot cover the lift amount of the diaphragm 20, but by using the main actuator 60 operated by the operation gas G and the piezoelectric actuator 100 in combination, the flow rate can be precisely adjusted by the piezoelectric actuator 100 having a relatively short stroke while securing the flow rate supplied by the valve device 1 by the main actuator 60 having a relatively long stroke.

In FIG. 1, the controller 200 is electrically connected with a plurality of valve devices 1 by the wiring SL consisting of signal lines and feed lines. Supply tubes FL for supplying the operation gas (driving air) G is connected to the plurality of valve devices 1 via open-close valves V1. Each supply tube FL is connected to a common drive air supply 250. The plurality of open-close valves V1 are formed of, for example, solenoid valves, and are connected to the controller 200 via respective control signal lines CL.

The controller 200 includes hardware such as CPUs (Central Processing Unit), memories, input/output circuits, etc., and required software. The controller 200 controls opening and closing of open-close valve V1, and controls driving of the piezoelectric actuator 100 incorporated in valve device 1.

In addition, the controller 200 has a function of detecting a voltage caused by an external force acting on the piezoelectric element of the piezoelectric actuator 100.

The piezoelectric element of the piezoelectric actuator 100, as described above, extends by applying a voltage. On the other hand, the piezoelectric element, when applied with an external force, a strain is formed, and a voltage corresponding to the strain is generated. Since the voltage generated in the piezoelectric element is proportional to the strain formed, the strain due to the external force of the piezoelectric element can be detected by measuring a voltage between both terminals of the piezoelectric element. That is, the piezoelectric actuator 100 can also be used as a sensor for detecting an external force. Further, even in a state of applying a voltage to the piezoelectric element, application of an external force to the piezoelectric element can be detected by a detection circuit that can separate the applied voltage and the voltage generated by the external force.

In the present embodiment, by detecting the external force, that is, the voltage generated by the operating pressure, acting on the piezoelectric element of the piezoelectric actuator 100, the opening and closing state of flow path of the valve device 1 which is opened and closed by the diaphragm 20 is detected.

An example of processing by the controller 200 will be described with reference to the flowchart of FIG. 2.

First, the controller 200 outputs a drive-air supply command to the open-close valve V1 through the control signal line CL in step S1.

When the open-close valve V1 is opened, as shown in (1) of FIG. 3, the operating pressure by the driving air into the valve device 1 starts to rise at the time t0. Along with this, as shown in FIG. 3 (2), the pistons 61 and 62 of valve device 1 start to move, and operating member 40 moves in the opening direction A1. The piezoelectric actuator 100 receives a force in the opening direction A1 from operating member 40, and as shown in (3) of FIG. 3, the piezoelectric element of the piezoelectric actuator 100 generates a voltage (piezo voltage).

The controller 200, after outputting a drive-air supply command, it is determined whether the piezo voltage is generated (step S2). Specifically, for example, when the piezo voltage generates a pulse-shaped voltage exceeding a predetermined voltage, as shown in (4) in FIG. 3, the controller 200 determines that the flow path of the valve device 1 is opened at time t1 (step S3).

Next, the controller 200 adjusts the opening degree (flow rate) of valve device 1 (step S4).

Thereafter, the controller 200 starts normal control in step S5.

Here, an example of normal control by the controller 200 will be described.

The controller 200 gives an open/close command to the open-close valve V1 in a predetermined cycle (e.g., several milliseconds), to executes the open/close control of valve device 1.

Graph shown in FIG. 4A (1) shows a voltage signal of the piezoelectric device when the valve device 1 is subjected to an open/close control at a predetermined cycle. Graph (2) shown in FIG. 4A, as a comparative example, shows a signal when detecting the opening and closing of valve device 1 by the limit switch.

Both the signals of the piezoelectric elements and the signals of the limit switches vary periodically in response to the opening and closing of valve device 1.

The key point here is that the rise of the signal of the piezoelectric device is much faster than that of the limit switch, as shown in FIG. 4B (1). This means that the open/close state of valve device 1 can be quickly detected by using the signals of the piezoelectric elements compared to the limit switches when valve device 1 is controlled to open/close at with a high frequency of several milliseconds.

When the signal of the piezoelectric element of the piezoelectric actuator 100 is used to detect the open/close state of valve device 1, the open/close control of valve device 1 can be performed at a higher frequency than when the signal of the limit switch is used.

Next, referring to FIG. 11, application examples of valve device 1 and the controllers 200 will be described.

Semiconductor manufacturing apparatus 1000 shown in FIG. 11 is a system for performing a semiconductor manufacturing process according to the ALD method, where 300 denotes a process gas source, 400 denotes a gas box, 500 denotes a tank, 700 denotes a processing chamber, and 800 denotes an exhaust pump.

In the semiconductor manufacturing process by the ALD method, it is necessary to precisely adjust the flow rate of the processing gas, and in order to address the increase of the diameter of the substrate, it is also necessary to ensure a certain amount of flow rate of the processing gas.

The gas box 400 is an integrated gas system (fluid control device) that integrates and houses various fluid control devices, such as open-close valve, regulators, and mass flow controllers, to provide accurately metered process gases to the processing chamber 700.

The tank 500 functions as a buffer for temporarily storing the processing gas supplied from the gas box 400.

The processing chamber 700 provides a sealed processing space for forming a film on a substrate by an ALD method.

Exhaust pump 800 draws a vacuum in the processing chamber 700.

According to the system configuration as described above, by sending the control signal SG1 from the controller 200 to open-close valve V1, the valve device 1 can be opened. This state, as described above, can be detected by the output signal of the piezoelectric element of the piezoelectric actuator 100. If a command SG2 for adjusting the flow rate is sent to valve device 1, the process gases can be initially adjusted.

Further, by outputting a control signal SG1 for open-close control of valve device 1 at a high frequency from the controller 200 to the open-close valve V1, it is possible to execute the open-close control of valve device 1 described with reference to FIG. 4A.

In the above embodiment, cases of using the detection signals of the piezoelectric element not only for starting the opening degree (flow rate) adjustment operation but also for periodic open-close control of valve device are exemplified, but the present invention is not limited thereto. The detection signal of the piezoelectric element may be utilized only to start the opening degree (flow rate) adjustment operation.

Referring to FIG. 12, an exemplary fluid control device to which the valve device of the present invention is applicable will be described.

In the fluid control device shown in FIG. 12, a metallic base plate BS extending in the longitudinal direction G1, G2 and arranged along the width direction W1, W2 is provided. Note that W1 represents the front side, W2 represents the back side, G1 represents the upstream side, and G2 represents the downstream side. Various fluid devices 991A to 991E are installed on the base plate BS via a plurality of flow path blocks 992, and a flow path (not shown) through which fluid flows from the upstream side G1 to the downstream side G2 is formed by the plurality of flow path blocks 992.

Here, the "fluid device" is a device used in the fluid control device for controlling the flow of a fluid, the device comprising a body defining a fluidic flow path and having at least two flow path ports opening at the surfaces of the body.

Specifically, the fluid devices include on-off valves (2-way valves) 991A, regulators 991B, pressure gauges 991C, on-off valves (3-way valves) 991D, mass flow controllers 991E and the like, but not limited thereto. The introducing tube 993 is connected to an upstream flow path port of flow path (not shown).

The present invention can be applied to various valve devices such as the above-described on-off valves 991A and 991D and the regulators 991B.

REFERENCE SIGNS LIST

1: valve device
10: Valve body
10*a*: valve body main unit
10*b*, 10*c*: connecting portion
12,13: flow path
14: Valve chamber
15: Valve seat
16: Screw portion
20: Diaphragm
25: Pressing adapter
30: Bonnet
36: Screw portion
38: Diaphragm presser
40: Operating member
40*t*: Abutting surface
41, 42: Flow passage
43: Inner surface
45: Flange portion
48: Closing part
50: Casing
51: Cylindrical portion
52: Holding part
53: Air passage
56: Screw hole
60: Main actuator
61,62: Piston
63: Bulkhead
70: Adjustment body
71,81: Flow passage
80: Actuator presser
90: Coil spring
100: Piezoelectric actuator
101: Case body
102: Fore-end portion 103: Base end portion
105: Wiring
110: Actuator receiver
110a: Receiving surface
110t: Regulating surface
120: Disk spring
150: Pipe fitting
160: Pipe
200: Controller
250: Drive Air Supply
300: Process gas source
400: Gas box
500: Tank
700: Processing chamber
800: Exhaust pump
991A: Open/close valve (2-way valve)
991B: Regulator
991C: Pressure gauge
991D: Open/close valve (3-way valve)
991E: Mass flow controller
992: Flow path block
993: Introducing tube
1000: Semiconductor manufacturing apparatus
A1: Opening direction
A2: Closing direction
BS: Base plate
C1, C2: Cylinder chamber
CL: Control signal lines
CP: Closed position
Ch: Flow passage
Ct: Central line
FL: Feed tube
G: Operating gas (driving air)
G1: Longitudinal direction (upstream)
G2: Longitudinal direction (downstream)
Lf, Lf+, Lf−: Lift
OP: Open position
OR: O-ring
SG1: Control signal
SG2: Directive
SL: Wiring
SP: Space
V0: Predetermined voltage
V1: Open-close valve
W1, W2: Width direction
h1: Air passage

The invention claimed is:

1. A valve, comprising:
a valve body having a flow path for flowing fluid;
a valve element that opens and closes the flow path for the flowing fluid;
a biasing member that biases the valve element toward the closing direction of the flow path;
a main actuator that moves the valve element against the biasing force of the biasing member; and
an adjuster that utilizes a piezoelectric element for adjusting an opening degree of the flow path determined by the valve body,
wherein the valve is configured to output a voltage generated by the piezoelectric element or a signal based on the voltage generated by the piezoelectric element.

2. A controller for a valve,
wherein the valve comprises:
a valve body having a flow path for flowing fluid;
a valve element that opens and closes the flow path for the flowing fluid,
a biasing member that biases the valve element toward the closing direction of the flow path,
an actuator that moves the valve element against the biasing force of the biasing member, and
an adjuster that utilizes a piezoelectric element for adjusting an opening degree of the flow path determined by the valve body,
the controller comprising:
a detector that detects, via detected signals, open/close state of the flow path based on the voltage generated by the piezoelectric element, and
a valve control configured to control the valve by utilizing the detected signals of the detector.

3. A control method for a valve,
wherein the valve device comprises:
a valve body having a flow path for flowing fluid;
a valve element that opens and closes the flow path for the flowing fluid,
a biasing member that biases the valve element toward the closing direction of the flow path,
an actuator that drives the valve element against the biasing force of the biasing member, and
an adjuster that utilizes a piezoelectric element for adjusting an opening degree of the flow path determined by the valve body,
the method comprising:
detecting, via detected signal, open/close state of flow path based on the voltage generated by the piezoelectric element, and
controlling the valve by using the detected signal.

* * * * *